US007770224B2

(12) United States Patent
Pellegrino et al.

(10) Patent No.: US 7,770,224 B2
(45) Date of Patent: Aug. 3, 2010

(54) CBRN ATTACK DETECTION SYSTEM AND METHOD I

(75) Inventors: Francesco Pellegrino, Cold Spring Harbor, NY (US); Kevin J. Tupper, Naples, FL (US); Edward J. Vinciguerra, North Bellmore, NY (US); Thomas J. Psinakis, East Meadow, NY (US); Robert D'italia, Melville, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 1371 days.

(21) Appl. No.: 11/212,342

(22) Filed: Aug. 26, 2005

(65) Prior Publication Data

US 2007/0269770 A1 Nov. 22, 2007

Related U.S. Application Data

(60) Provisional application No. 60/619,884, filed on Oct. 18, 2004.

(51) Int. Cl.

| | |
|---|---|
| ***G06F 11/00*** | (2006.01) |
| *G06F 12/14* | (2006.01) |
| *G06F 12/16* | (2006.01) |
| *G08B 23/00* | (2006.01) |

(52) U.S. Cl. .......................................... 726/23; 726/25

(58) Field of Classification Search ................... 726/22, 726/23, 24, 25

See application file for complete search history.

(56) References Cited

U.S. PATENT DOCUMENTS

| | | | | |
|---|---|---|---|---|
| 5,666,518 | A * | 9/1997 | Jumper | 703/23 |
| 6,128,918 | A * | 10/2000 | Deaton et al. | 62/610 |
| 6,160,517 | A * | 12/2000 | Bell et al. | 343/703 |
| 6,293,861 | B1 * | 9/2001 | Berry | 454/255 |
| 6,515,977 | B2 * | 2/2003 | Bi et al. | 370/342 |
| 6,545,278 | B1 * | 4/2003 | Mottier et al. | 250/339.13 |
| 6,660,054 | B2 * | 12/2003 | Manna et al. | 55/385.2 |
| 6,777,228 | B2 * | 8/2004 | Lejeune | 435/309.1 |
| 6,851,769 | B2 * | 2/2005 | Hauville | 312/1 |
| 6,931,431 | B2 * | 8/2005 | Cachin et al. | 709/205 |
| 7,026,944 | B2 * | 4/2006 | Alioto et al. | 340/600 |
| 7,053,783 | B2 * | 5/2006 | Hamburger et al. | 340/630 |
| 7,074,261 | B2 * | 7/2006 | Murphy | 96/223 |
| 7,102,514 | B2 * | 9/2006 | Berry | 340/540 |
| 7,180,418 | B1 * | 2/2007 | Willms et al. | 340/568.1 |
| 7,237,115 | B1 * | 6/2007 | Thomas et al. | 713/176 |
| 7,249,006 | B2 * | 7/2007 | Lombardo et al. | 703/2 |
| 7,266,484 | B2 * | 9/2007 | Lombardo et al. | 703/11 |
| 7,430,046 | B2 * | 9/2008 | Jiang et al. | 356/336 |
| 7,542,884 | B2 * | 6/2009 | Boris et al. | 703/2 |
| 2002/0124537 | A1 * | 9/2002 | Manna et al. | 55/385.2 |
| 2002/0129087 | A1 * | 9/2002 | Cachin et al. | 709/200 |
| 2003/0006899 | A1 * | 1/2003 | Najmi et al. | 340/540 |
| 2003/0009239 | A1 * | 1/2003 | Lombardo et al. | 700/30 |
| 2003/0167740 | A1 * | 9/2003 | Murphy | 55/337 |

(Continued)

OTHER PUBLICATIONS

Charioui, Mohamed, "U.S. Appl. No. 11/212,343 Office Action"; Date of Mailing Apr. 1, 2008; Publisher: USPTO.

*Primary Examiner*—David García Cervetti
(74) *Attorney, Agent, or Firm*—DeMont & Breyer, LLC

(57) ABSTRACT

An apparatus and methods for improving the ability of a detection system to distinguish between a "true attack" as opposed to a nominal increase in a monitored environmental characteristic.

20 Claims, 9 Drawing Sheets

U.S. PATENT DOCUMENTS

2004/0064260 A1* 4/2004 Padmanabhan et al. ....... 702/19
2004/0078146 A1* 4/2004 Lombardo et al. ............ 702/19
2004/0088406 A1* 5/2004 Corley et al. ................ 709/224
2004/0116821 A1* 6/2004 Beiswenger et al. ........ 600/549
2004/0120851 A1* 6/2004 Aamodt ....................... 422/28
2004/0257227 A1* 12/2004 Berry ......................... 340/540
2006/0071803 A1* 4/2006 Hamburger et al. ......... 340/630
2006/0152372 A1* 7/2006 Stout ....................... 340/573.1
2007/0013910 A1* 1/2007 Jiang et al. .................. 356/336
2007/0028569 A1* 2/2007 Murphy ....................... 55/337
2007/0038383 A1* 2/2007 Boris et al. ................... 702/19

* cited by examiner

Method 100

CBRN ATTACK DETECTION SYSTEM AND METHOD I

STATEMENT OF RELATED CASES

This application claims priority of U.S. Provisional Patent Application Ser. No. 60/619,884, filed Oct. 18, 2004.

FIELD OF THE INVENTION

The present invention relates to civil defense in general, and, more particularly, to chemical, biological, radiological, and nuclear (CBRN) attack-detection systems.

BACKGROUND OF THE INVENTION

A chemical, biological, radiological, or nuclear (CBRN) attack on a civilian population is a dreadful event. The best response requires the earliest possible detection of the attack so that individuals can flee and civil defense authorities can contain its effects. To this end, chemical, biological, radiological, and nuclear (CBRN) attack-detection systems are being deployed in many urban centers.

It is important, of course, that a CBRN attack-detection system is able to quickly determine that an attack has occurred. But it is also important that the attack-detection system does not issue false alarms. As a consequence, testing and calibration of each attack-detection system is important.

It would be desirable to test and calibrate each CBRN attack-detection system at its intended deployment location. But to do so would be very expensive and, of course, only simulants, not the actual agents of interest, could be used. The current practice for testing and calibration is to release physical simulants in outdoor test locations or in special test chambers. This approach is of questionable value and relatively expensive.

First, to the extent that the calibration is performed outdoors, simulants, rather than the actual agents (e.g., anthrax, etc.) must be used. Second, due to the aforementioned expense of repeated runs, attack-detection systems are typically calibrated based on only a limited number of attack scenarios. This brings into question the ability of the detector to accurately discriminate over a wide range of scenarios. Third, whether the calibration is performed outdoors or in a special test chamber, it doesn't replicate the actual environment in which the system is to operate. Differences in terrain and ambient conditions between the test site and the actual deployment location will affect the accuracy of the calibration.

Regarding expense, every system that is scheduled to be deployed must be tested. Furthermore, a large number of attack scenarios (e.g., different concentrations, different simulants, etc.) should be simulated for proper calibration. Each additional run means added expense.

In view of present practice, and the implications of inaccuracy, there is a need for a more reliable, accurate, and cost-effective approach for testing and calibrating attack-detection systems.

SUMMARY OF THE INVENTION

The present invention provides an improved attack-detection system and methods.

In some embodiments, the present invention provides a method for obtaining data for calibrating an attack-detection system that avoids some of the costs and disadvantages of the prior art.

In accordance with this method, (1) background data and (2) attack data are separately obtained and then combined. In particular, the characteristic background signature (e.g., particle count, etc.) prevailing at the intended deployment environment (e.g., a fixed site such as an airport, a subway station, etc.) is obtained. Usually, a days-worth of data is sufficient. In some embodiments, this signature is extrapolated to longer time intervals to include both diurnal and seasonal variations, such as temperature, relative humidity, pollen counts, train schedules (if the target environment is a subway station), etc. As to item (2), the specific agents of interest, such as anthrax, etc., are released in a test chamber. Alternatively, simulants can be used instead of the actual agents. Release data is obtained and used to model various attack scenarios. Modeling is performed using computational fluid dynamics and/or other techniques to generate time-dependent release (attack) data. The attack data is then superimposed on the background (or extrapolated background) data.

The inventors recognized that by decoupling the background particle signature from "attack" data, as described above, the cost of data acquisition could be reduced and the value of the data would be substantially increased. That is, since the "background data" and the "attack data" are decoupled, the attack data can be based on limited and even one-time testing in a chamber. Since this testing does not need to be repeated for each system deployment, and since it is performed in a chamber, the actual agents of interest (e.g., anthrax, etc.) can be used. These agents are very carefully regulated, very expensive, and are not readily obtained. Using the release data, a very large number (e.g., 1000+, etc.) of attack scenarios are modeled using any of a variety of different computational methods.

The attack data is superimposed on the characteristic background particle signature. Again, since the background particle signature is obtained at the intended deployment location, this provides a far better basis for evaluating the ability of a detector to discriminate an actual attack from a nominal increase in the background particle level.

In some other embodiments, the present invention provides a method for evaluating the ability of an attack-detection system to discriminate between a "true" attack and a nominal increase in background particulate content. The method involves generating a time-varying "threshold" by applying the combined attack/background signature data and a plurality of parameter values (e.g., different window sizes for a moving average, different numbers of standard deviations, etc.) to a function under test. The threshold defines the "attack"/"no-attack" boundary. A particle count, etc., that exceeds the threshold is indicative of an attack. Since the threshold varies based on changes in the background particulate content, it will be a better discriminator than a fixed threshold.

Thousands of attack scenarios are modeled for each function being tested. The number of "true positives" (i.e., detected attacks), "false positives," (i.e., false alarms), "false negatives," (i.e., undetected attacks) and "true negatives" are recorded for the function. These measures can then be used to evaluate the efficacy of the function.

In particular, a penalty function is defined. The value of the penalty function—the penalty value—is based, for example, on the measures listed above. The penalty-value calculation is repeated for a plurality of candidate functions, wherein each candidate function is evaluated using a plurality of attack scenarios and background particle counts.

A "best" function is selected based on a comparison of penalty values. The attack-detection system is then implemented using the best function as the basis for discriminating attacks from nominal increases in background particle count.

In yet some further embodiments, the present invention provides an improved attack-detection system that utilizes the methods described above. The attack-detection system includes a sensor that continuously monitors the concentration of airborne particles and a processor that generates a time-varying threshold. An alert is generated if, and only if, the concentration of airborne particles exceeds the current value of the threshold. As previously described, use of a time-varying threshold, rather than a fixed threshold, accounts for variations in the background particle concentration, which can increase the probability of detection of an attack.

The system's processor generates the time-varying threshold using a function and certain parameters. The function and parameters that are used by the processor are selected from among a plurality of candidate functions and parameters.

The illustrative embodiment comprises:

- Obtaining, over a nominal time interval, the characteristic background signature (i.e., particle count) at an actual target environment (e.g., an airport, subway station, etc.). In some embodiments, this data is extrapolated over longer time intervals to include both diurnal and seasonal variations, such as temperature, relative humidity, pollen counts, train schedules (if the target environment is a subway), etc.
- Obtaining time-dependent release data for agent(s) of interest.
- Modeling various attack scenarios using computational fluid dynamics and/or other techniques, based on the actual release data, to generate time-dependent attack data.
- Superimposing the attack data on the background (or extrapolated background) data.
- Generating a time-varying threshold by applying the superimposed data and a plurality of parameter values (e.g., different window sizes for a moving average, different numbers of standard deviations, etc.) to a function under test.
- Defining a penalty function and calculating a penalty value for the time-varying threshold. The penalty value is a measure of the efficacy of the function. The penalty value is based, for example, on the rate of "true positives" (i.e., detected attacks), "false positives," (i.e., false alarms), "false negatives," (i.e., undetected attacks) and "true negatives" for the time-varying threshold.
- Repeating the penalty-value calculation for a plurality of candidate functions and parameter values under a variety of attack scenarios.
- Selecting a "best" function and parameter values based on a comparison of the penalty value for each of the time-varying thresholds that were generated.

DETAILED DESCRIPTION

For the purposes of the specification and the appended claims, the term "calendrical time" is defined as indicative of one or more of the following:

(i) a time (e.g., 16:23:58, etc.), (ii) one or more temporal designations (e.g., Tuesday, November, etc.), (iii) one or more events (e.g., Thanksgiving, John's birthday, etc.), and (iv) a time span (e.g., 8:00 pm to 9:00 pm, etc.).

Figure 1:
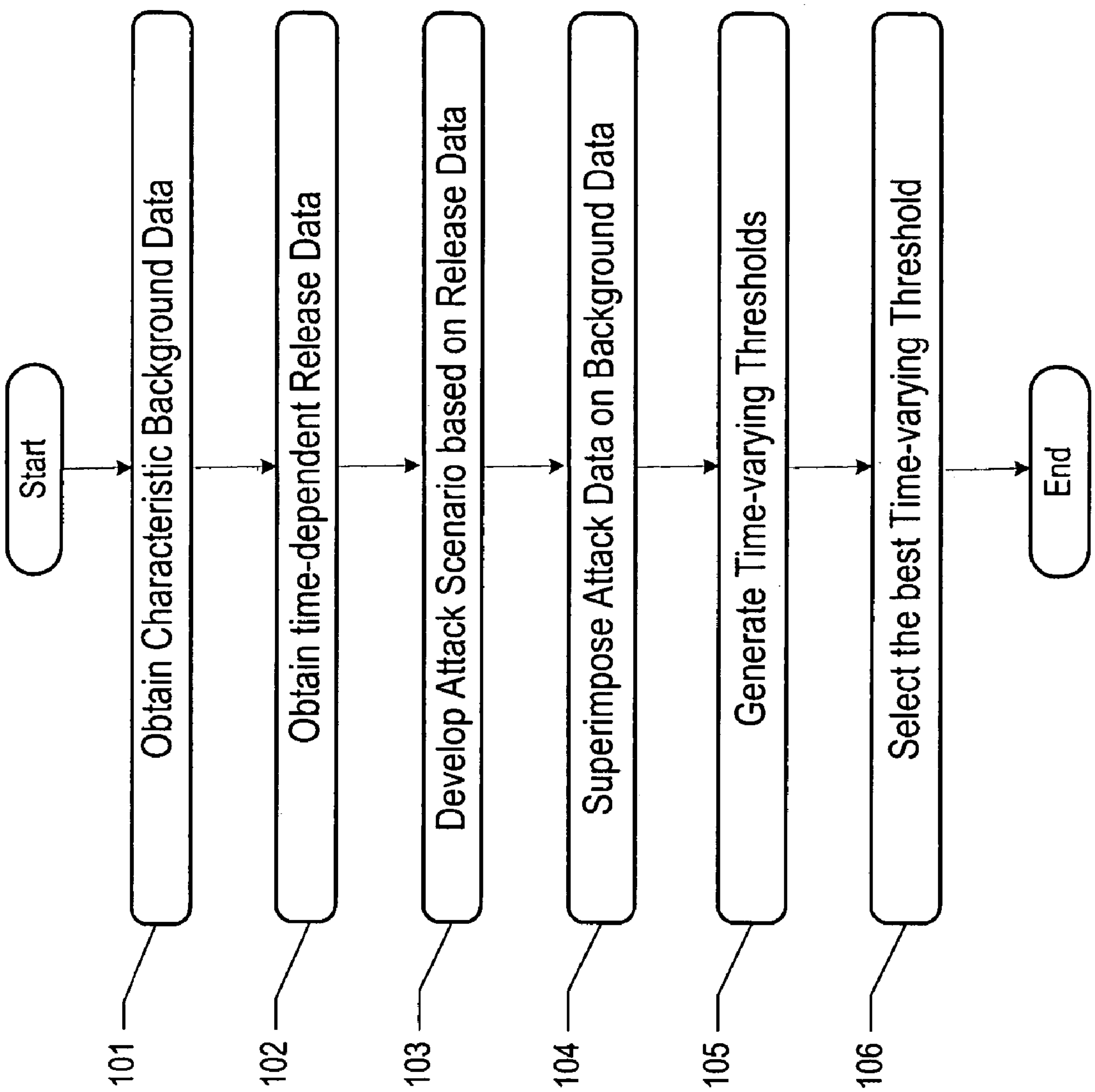
FIG. 1 depicts a method in accordance with the illustrative embodiment of the present invention.

FIG. 1 depicts a flowchart of the salient tasks of method 100 in accordance with the illustrative embodiment of the present invention. Method 100 is described below with reference to FIGS. 2-7.

Task 101 of method 100 recites obtaining a characteristic background signature, B, of an environmental characteristic of interest. In the illustrative embodiment, the environmental characteristic is the concentration of airborne particulates having a size in a range of about 1 to 10 microns. In some other embodiments, other environmental characteristics of interest can be considered. The signature is obtained at the eventual intended deployment site of the monitoring system (e.g., attack-detection system, etc.).

The background characteristic is obtained over a time interval that is sufficient for capturing any routine variation in the background signature. That is, to the extent that a fluctuation occurs on a regular basis at a specific time due as a consequence of a regularly reoccurring event (e.g., rush hour, cleaning, etc.), the monitoring period must capture it. Typically, 12 to 48 hours-worth of data gathering should be sufficient. Those skilled in the art, after reading this disclosure, will know how to obtain the desired data.

In some embodiments, the actual background signature is modified to account for diurnal and seasonal variations. For example, variations in temperature, relative humidity, pollen count, train schedules (as appropriate) are considered. Those skilled in the art, after reading this disclosure, will know how to modify the characteristic background signature with diurnal and seasonal variations.

Figure 2:
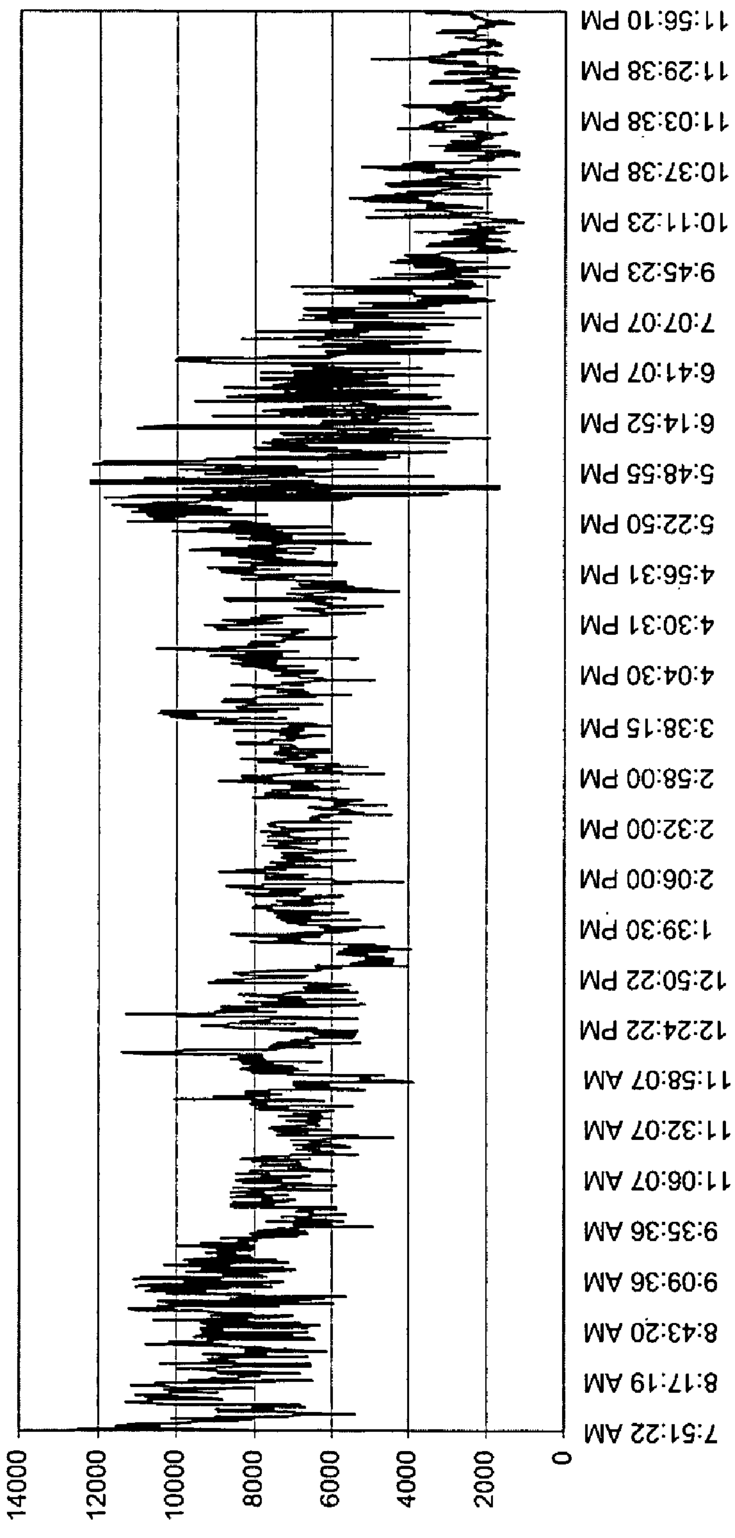
FIG. 2 depicts an exemplary graph of a background data signal, in accordance with the illustrative embodiment of the present invention.

FIG. 2 depicts an exemplary graph of background data signal B(t) as a function of time. The background signal is measured at an intended deployment location, in accordance with the illustrative embodiment of the present invention. In the illustrative embodiment, this graph plots the level of airborne particle concentration, for particles in a specific size range (e.g., 1 to 10 microns), as a function of time. This signal represents the normal level of the environmental characteristic at this location in the absence of an attack. This normal level is due, for example, to dirt, air pollution, pollen, etc.

With continuing reference to method 100, task 102 recites obtaining time-dependent release data. In some embodiments, this involves obtaining agents of interest (e.g., chemical, biological, etc.) and monitoring their release in a chamber. In some other embodiments, simulants, rather than the agents of interest, are released. The simulants are typically benign particles that are within a size range or other characteristic of interest. Those skilled in the art, after reading this disclosure, will know how to obtain the desired release data.

In task 103 of method 100, an "attack" scenario, A, is developed based on the actual release data. To develop the attack scenario, any of a variety of models, such as computational fluid dynamics, is used. The attack scenario will be based on a particular amount of agent being released, prevailing winds, temperature, etc.

Figure 3:
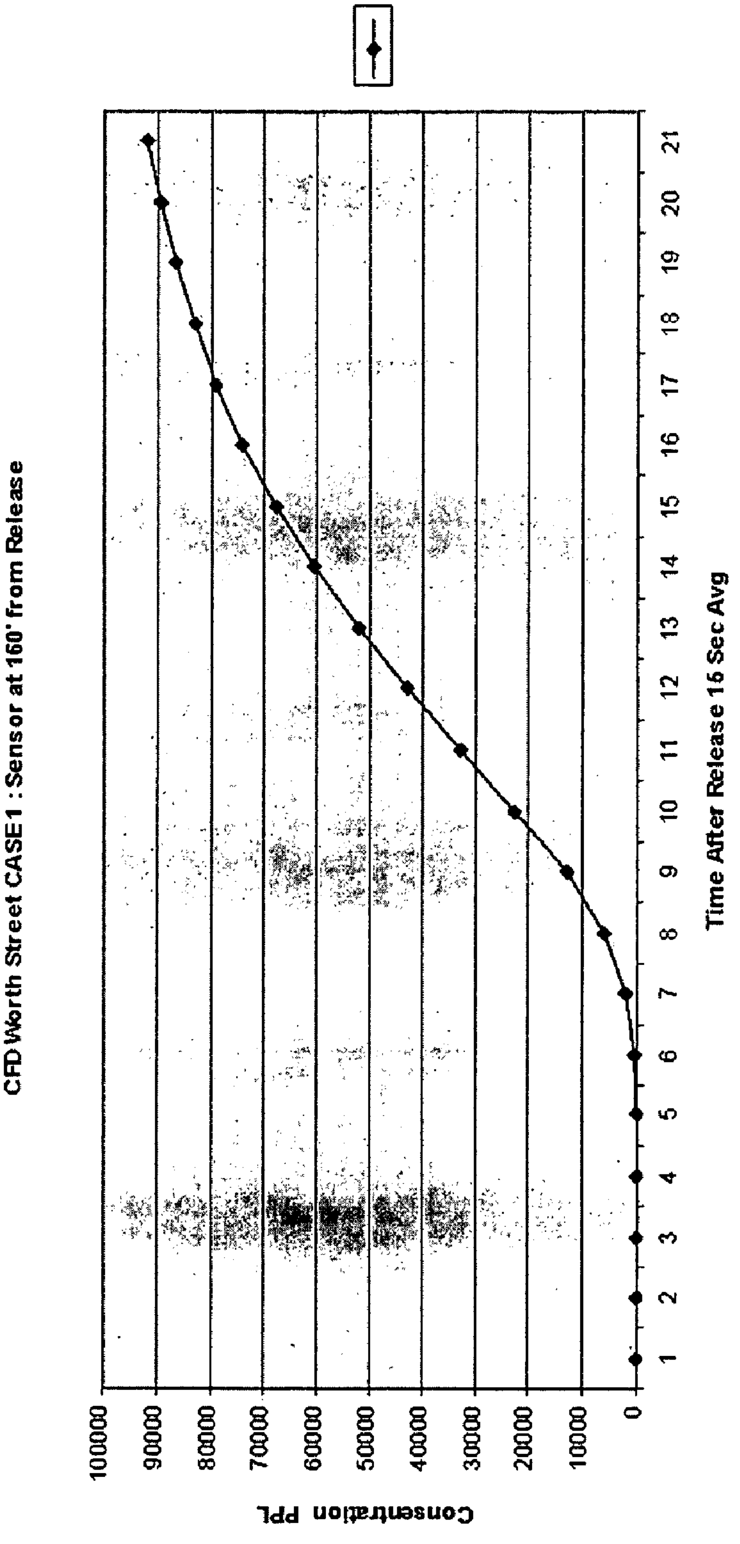
FIG. 3 depicts an exemplary graph of an attack data signal A(t).

FIG. 3 shows attack data signal A(t). This graph depicts the concentration, in particles per liter (PPL), of an agent as a function of time after release, where time is shown as 15 second averages (i.e., T=1 is 15 seconds after release, etc.).

The attack data signal depicted in FIG. 3 is based on an attack scenario wherein 1 gram of an aerosolized agent is released in a subway station at time T=0. The particle plume is driven by a 2.2 feet per second stream of air flowing along the subway platform. The sensor is assumed to be 160 feet from the location of release.

Returning again to FIG. 1 and method 100, task 104 recites superimposing the attack data on the characteristic background signature of the environmental characteristic of interest.

Figure 4:
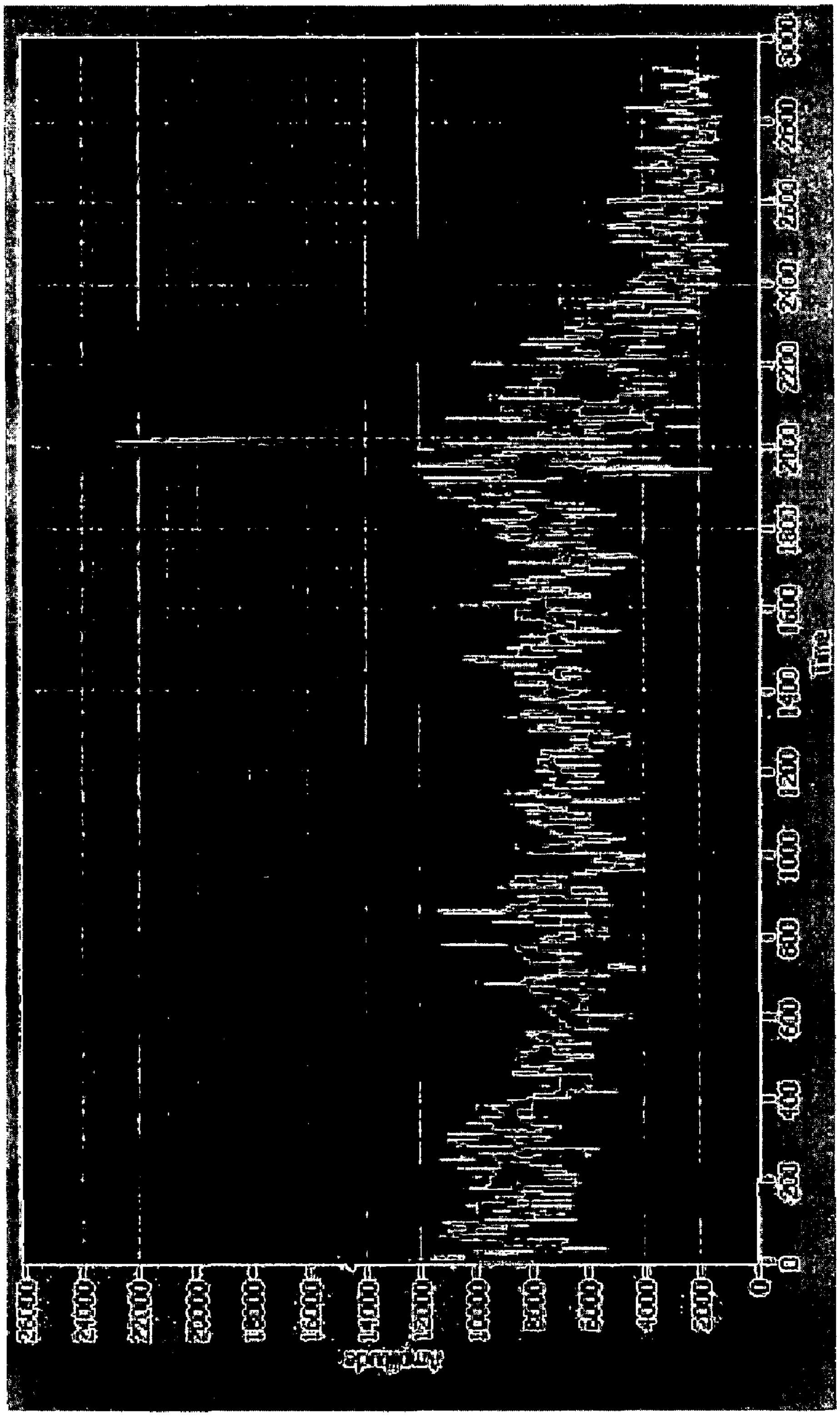
FIG. 4 depicts an exemplary graph of the background data signal of FIG. 1 summed with the attack data signal, in accordance with the illustrative embodiment of the present invention.

FIG. 4 depicts a plot of A(t)+B(t), where signal A(t) is the attack data signal of FIG. 3 and B(t) is the background data signal of FIG. 2. The graph of A(t)+B(t) therefore represents the level of the airborne particulates environmental characteristic when an attack occurs at the deployment location. The attack data signal A(t) can be scaled to represent different release amounts. In FIG. 4, the attack occurs at approximately time 2000, as reflected by the large spike.

In accordance with task 105 of method 100, a time-varying threshold, T(t), is generated. The time-varying threshold is the boundary that discriminates, between "attack" and "no-attack" boundary. A particle count, etc., that exceeds the threshold is indicative of an attack.

Time-varying threshold T(t) is generated by (1) selecting a function or expression, (2) selecting one or more parameters, and (3) applying the function and parameters to the superimposed data. Examples of parameters that are used in conjunction with a given function include, without limitation, a moving average of the data over a particular sliding time window (e.g., a 10-second window, a 20-second window, etc.), the standard deviation of the data in the time window, higher-order statistical moments of the data, and the like.

Many different time-varying thresholds are generated by changing the function and/or associated parameters. For each selected function and parameter set, thousands of attack scenarios are modeled and tested. This is done by permuting the attack scenarios in accordance with task 103, and superimposing them on the background data signature in accordance with task 104. In other words, each function and parameter set that is being tested is applied to a plurality of superimposed data: $A(t)_n$+B(t) wherein n=1 to about 1,000+ (often as high as about 10,000). Additionally, the background data set B(t) can also be varied.

Returning again to method 100, a "best" time-varying threshold is selected as per task 106. To do this, the performance of each function/parameter combination, as applied to each superimposed data set, is evaluated. Typical performance measures include the number of "true positives" (i.e., detected attacks), "false positives," (i.e., false alarms), "false negatives," (i.e., undetected attacks) and "true negatives" for the various attack scenarios that are run for each function/parameter combination.

Figure 5:
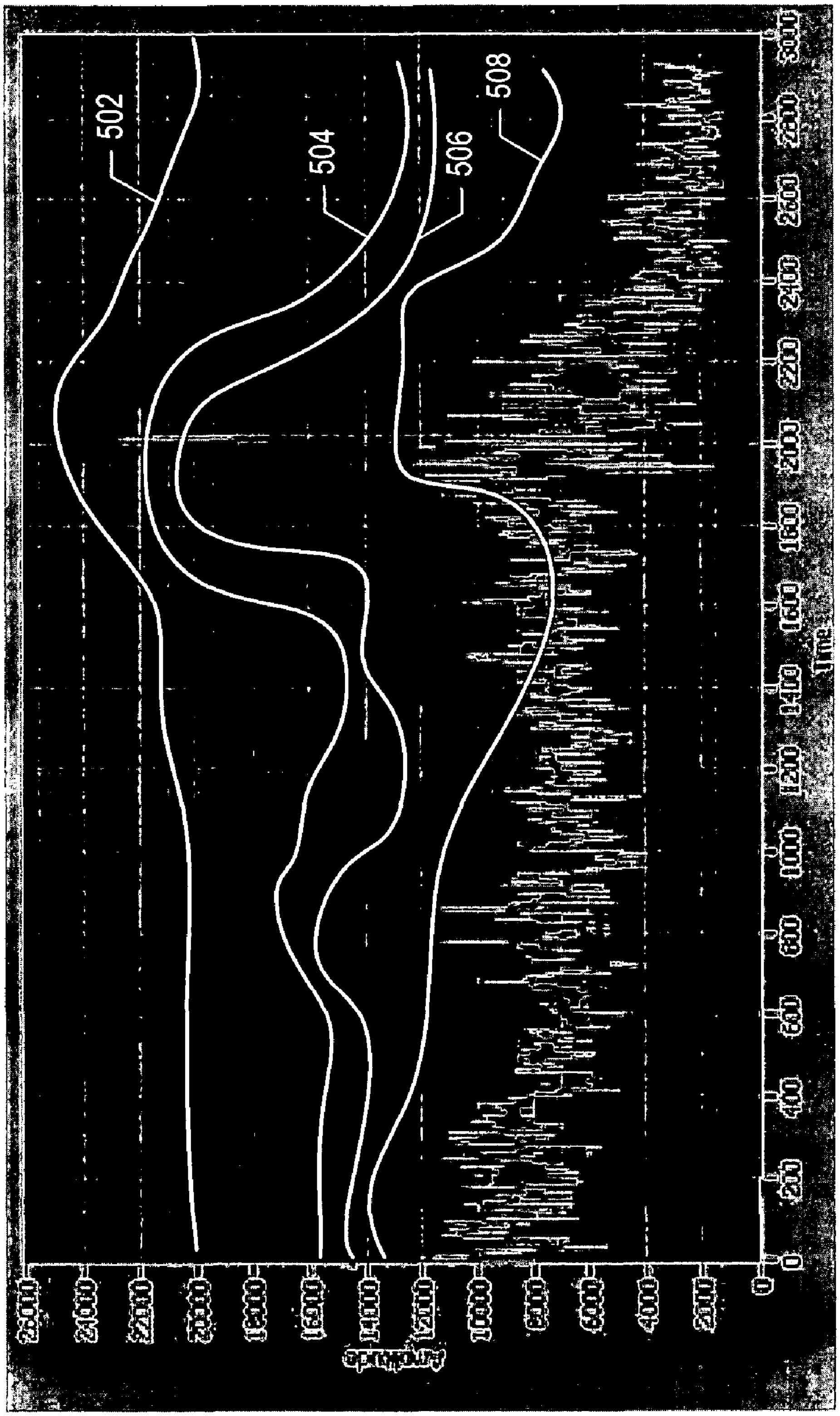
FIG. 5 depicts an exemplary graph of a plurality of time-varying thresholds, in accordance with the illustrative embodiment of the present invention.

FIG. 5 depicts an exemplary graph of a plurality of time-varying thresholds, in accordance with the illustrative embodiment of the present invention. A desirable time-varying threshold is one that has no false positives (i.e., the threshold is always greater than background data signal B(t)), and has no false negatives (i.e., every time there is an attack, A(t)+B(t) crosses above the threshold.) As shown in FIG. 5, time-varying threshold 502 is undesirable because the attack at time 2000 does not cross above the threshold, and thus threshold 502 has a false negative. Similarly, time-varying threshold 508 is undesirable because it crosses below background data signal B(t) at approximately time 1350, when no attack has yet occurred, and thus threshold 508 has a false positive.

Time-varying thresholds 504 and 506 both have no false negatives and no false positives. Intuitively, threshold 506 can be considered better than threshold 504 because it is always lower than threshold 504. Threshold 506 could, therefore, potentially detect an attack that evades detection by threshold 504.

In the illustrative embodiment, a quantitative measure, which is based on the performance measures described above, is used to evaluate the efficacy of the function.

In particular, the illustrative embodiment employs a penalty function that assigns a penalty value to a time-varying threshold over a particular time interval to quantify how "good" the threshold is. The penalty function is a function of an attack data signal A(t), a background data signal B(t), a time-varying threshold T(t), and a particular time interval.

In the illustrative embodiment, the penalty function reflects: the number of false positives over the time interval (the fewer the better); the number of false negatives over the time interval (the fewer the better); how tightly threshold T(t) bounds background data signal B(t) (the tighter the better); the sensitivity of threshold T(t) (i.e., the level of A(t)+B(t) at which T(t) correctly signals an attack, where lower is better), and the time delay between the initiation of an attack and T(t)'s signaling of the attack (the smaller the delay the better). Thus, the penalty function for a particular time-varying threshold T(t) is minimized when threshold T(t) is most desirable. As will be appreciated by those skilled in the art, some other embodiments of the present invention might employ a different penalty function to measure the efficacy of a particular time-varying threshold.

Once a penalty function has been defined, different threshold generators can be compared by comparing the penalty values of the resulting time-varying thresholds.

Figure 6:
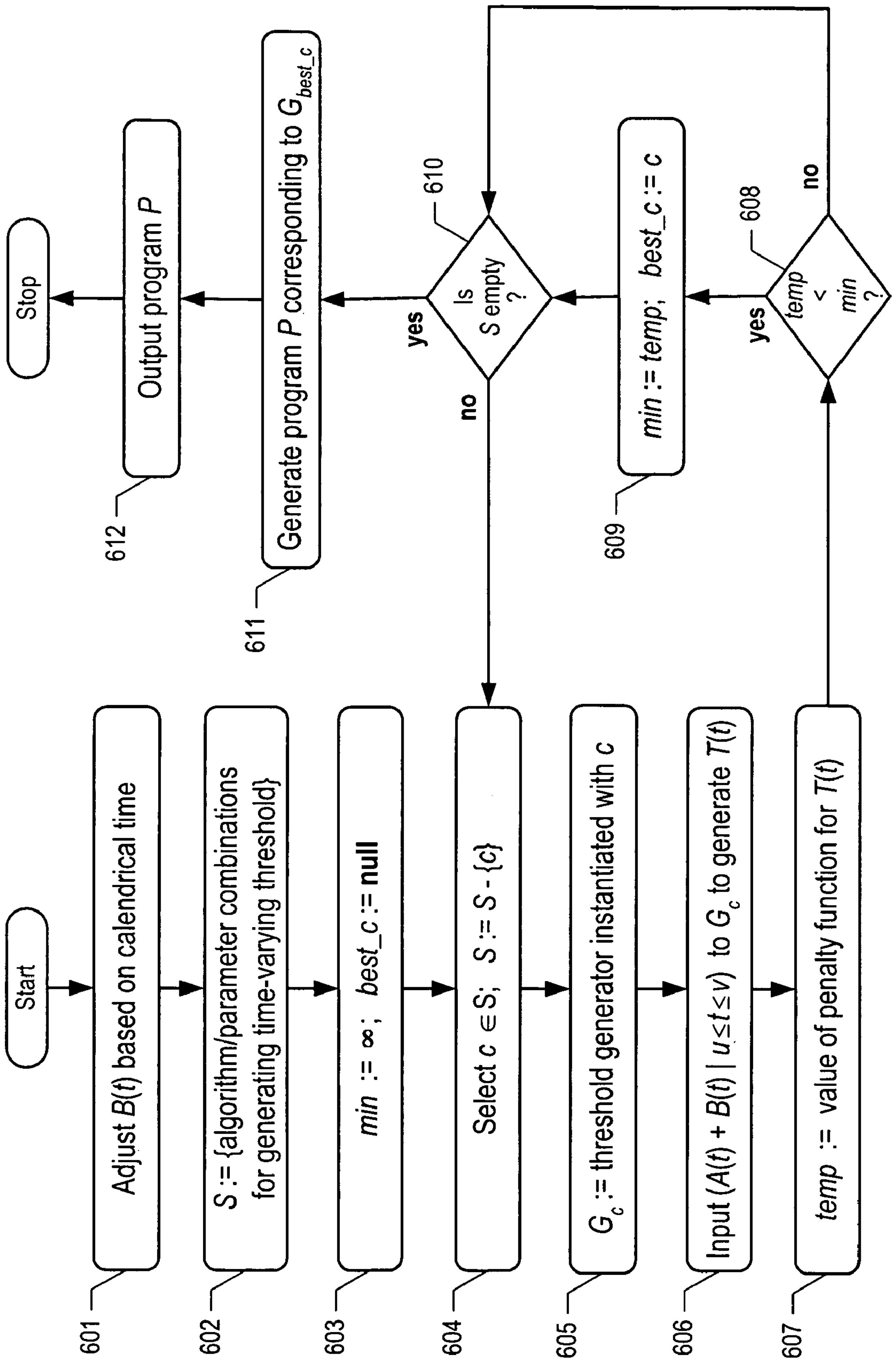
FIG. 6 depicts a flowchart of the salient tasks associated with evaluating a plurality of threshold generators, in accordance with the illustrative embodiment of the present invention.

FIG. 6 depicts a flowchart of the salient tasks associated with accomplishing tasks 105 and 106 of method 100. In particular, the method of FIG. 6 performs the following tasks:

Defines threshold generators for generating a plurality of thresholds, based on different functions, parameters, and attack scenarios;

Evaluates the merits of the threshold generators via a penalty function;

Selects the best generator (i.e., the generator whose threshold has the lowest penalty); and Generates a threshold-generation program based on the best generator.

It will be clear to those skilled in the art which tasks depicted in FIG. 6 can be performed simultaneously or in a different order than that depicted.

Turning now to the method of FIG. 6, at task 601, background data signal B(t) is adjusted, if necessary, based on the calendrical time interval during which the threshold generator will be executed at the deployment location. For example, background data signal B(t) measurements might have been obtained during the winter, while deployment might occur during the summer, when B(t) might be higher due to pollen and increased air pollution. Similarly, background data signal B(t) might be adjusted to reflect train schedules at a subway station, because the arrival of a train at a station causes wind drafts from "piston effects" that could alter B(t).

At task 602, set S is initialized to the various algorithm/parameter combinations of the candidate threshold generators to be evaluated. For example, set S might include: 10-second moving average; 20-second moving average; 10-second moving average+1 standard deviation; 20-second moving average+2.5 standard deviations; etc.

At task 603, variable min is initialized to ∞, and variable best_c is initialized to null.

At task 604, a member c of set S is selected, and c is deleted from S.

At task 605, variable $G_c$ is set to a threshold generator "shell" program (or "engine") and is instantiated with c's algorithm and parameter values.

At task 606, generator $G_c$ receives as input A(t)+B(t), $u \leqq t \leqq v$, and generates time-varying threshold T(t) based on this input.

At task 607, the penalty function is evaluated for threshold T(t) and stored in variable temp. Task 607 is described in detail below and with respect to FIG. 7.

Task 608 checks whether temp<min; if so, execution proceeds to task 609, otherwise, execution continues at task 610.

At task 609, temp is copied into min and c is copied into best_c.

Task 610 checks whether set S is empty; if so, execution proceeds to task 611, otherwise, execution continues back at task 604.

At task 611, a software program P that corresponds to $G_{best\_c}$ is generated. Program P receives a time-varying input signal in real time and generates a time-varying threshold from the input signal using the algorithm and parameter values of generator $G_{best\_c}$.

At task 612, the method outputs software program P, and then terminates.

Figure 7:
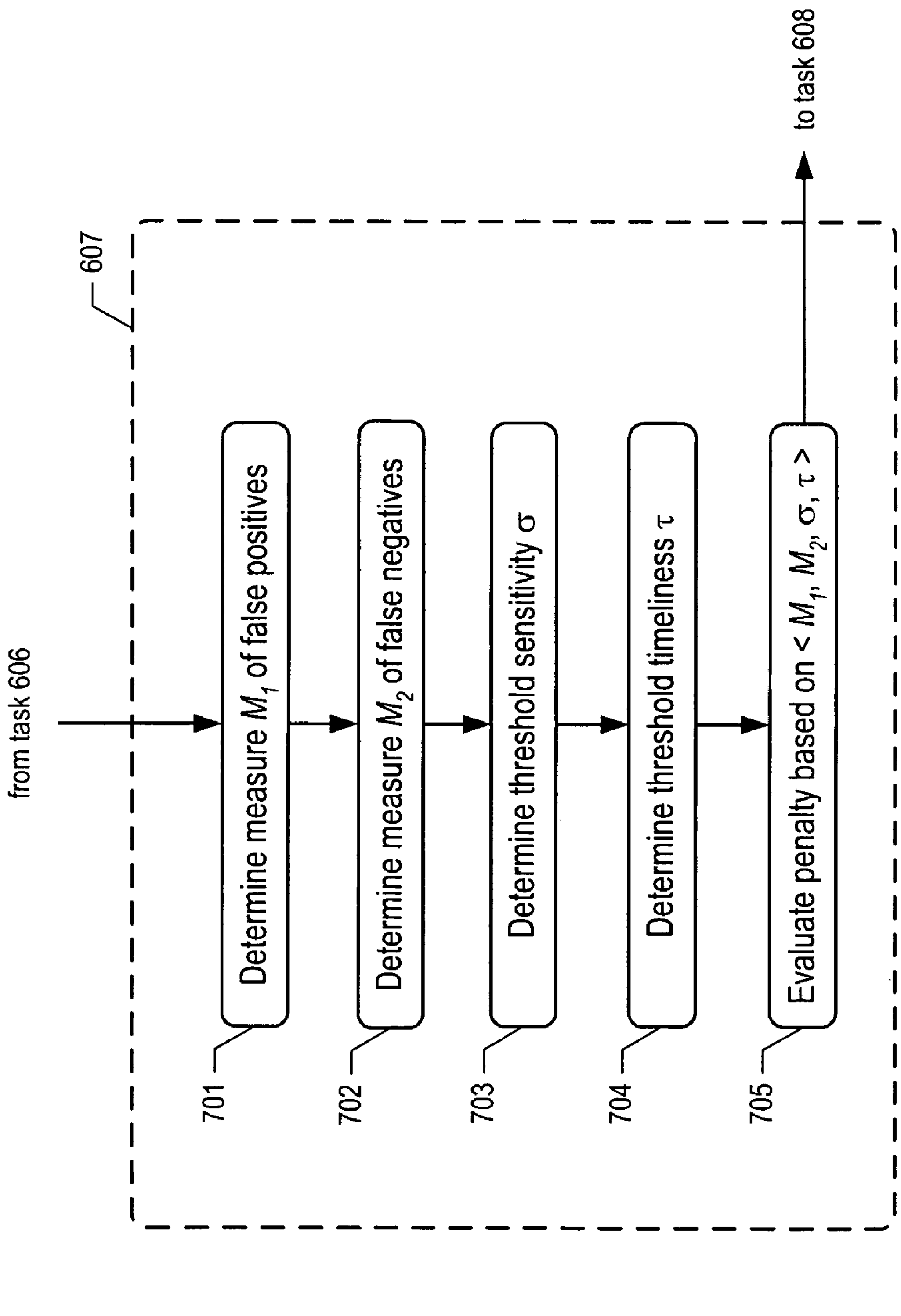
FIG. 7 depicts a detailed flowchart for task 607, as depicted in FIG. 6, in accordance with the illustrative embodiment of the present invention.

FIG. 7 depicts a detailed flowchart for task 607, in accordance with the illustrative embodiment of the present invention. It will be clear to those skilled in the art which tasks depicted in FIG. 7 can be performed simultaneously or in a different order than that depicted.

At task 701, a measure $M_1$ of false positives that occur with threshold T(t) over time interval [u, v] is determined. As will be appreciated by those skilled in the art, in some embodiments measure $M_1$ might reflect the number of false positives, while in some other embodiments another measure might be used (e.g., whether or not any false positives occur, etc.).

At task 702, a measure $M_2$ of false negatives that occur with threshold T(t) over time interval [u, v] is determined.

At task 703, the sensitivity σ of threshold T(t) (i.e., the value of A(t)+B(t) that causes threshold T(t) to correctly signal an attack) is determined.

At task 704, the timeliness τ of threshold T(t) (i.e., the time difference between the initiation of an attack and threshold T(t)'s signaling of the attack) is determined.

At task 705, penalty function p is evaluated based on measure $M_1$, measure $M_2$, sensitivity σ, and timeliness τ.

After task 705, execution continues at task 608 of FIG. 6.

Figure 8:
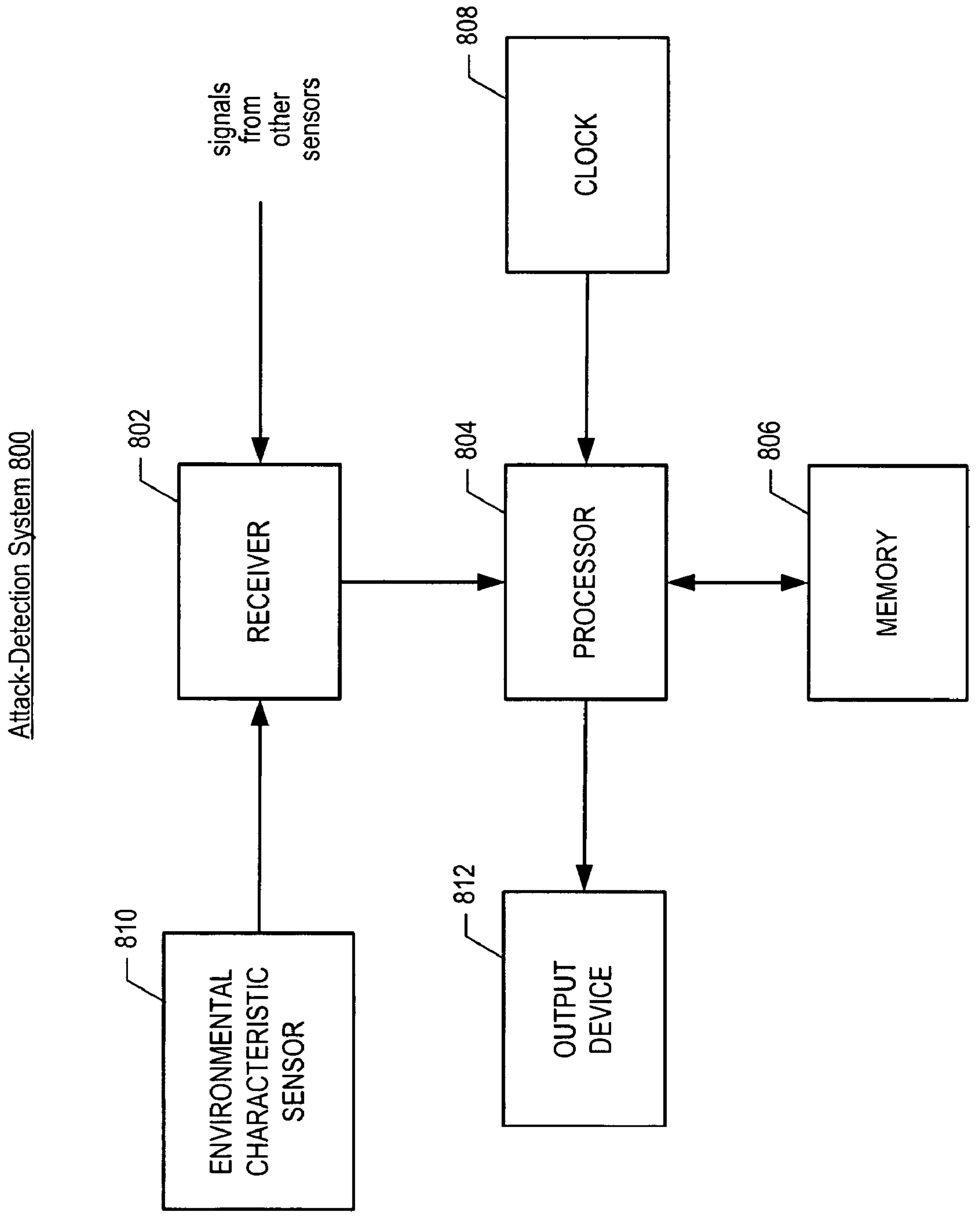
FIG. 8 depicts the salient components of an attack-detection system, in accordance with the illustrative embodiment of the present invention.

FIG. 8 depicts the salient components of attack-detection system 800, in accordance with the illustrative embodiment of the present invention. Attack-detection system 800 comprises receiver 802, processor 804, memory 806, clock 808, environmental characteristic sensor 810, and output device 812, interconnected as shown.

Environmental characteristic sensor 810 measures the level of an environmental characteristic (e.g., airborne particle concentration, radiation level, etc.) over time and generates a time-varying signal based on these measurements, in well-known fashion.

Receiver 802 receives a signal from environmental characteristic sensor 810 and forwards the information encoded in the signal to processor 804, in well-known fashion. Optionally, receiver 802 might also receive signals from one or more additional sensors that measure other environmental characteristics (e.g., wind speed, temperature, humidity, etc.) and forward the information encoded in these signals to processor 804. As will be appreciated by those skilled in the art, in some embodiments receiver 802 might receive signals from sensor 810 via a wired link, while in some other embodiments sensor 810 might have an embedded wireless transmitter that transmits signals wirelessly to receiver 802, and so forth. It will be clear to those skilled in the art how to make and use receiver 802.

Processor 804 is a general-purpose processor that is capable of: receiving information from receiver 802; reading data from and writing data into memory 806; executing software program P, described above with respect to FIG. 6; executing the tasks described below and with respect to FIG. 9; and outputting signals to output device 812. In some alternative embodiments of the present invention, processor 804 might be a special-purpose processor. In either case, it will be clear to those skilled in the art, after reading this specification, how to make and use processor 804.

Memory 806 stores data and executable instructions, as is well-known in the art, and might be any combination of random-access memory (RAM), flash memory, disk drive memory, etc. It will be clear to those skilled in the art, after reading this specification, how to make and use memory 806.

Clock 808 transmits the current time, date, and day of the week to processor 804 in well-known fashion.

Output device 812 is a transducer (e.g., speaker, video display, etc.) that receives electronic signals from processor 804 and generates a corresponding output signal (e.g., audio alarm, video warning message, etc.), in well-known fashion. As will be appreciated by those skilled in the art, in some embodiments output device 812 might receive signals from processor 804 via a wired link, while in some other embodiments attack-detection system 800 might also include a transmitter that transmits information from processor 804 to output device 812 (e.g., via radio-frequency signals, etc.). It will be clear to those skilled in the art how to make and use output device 812.

Figure 9:
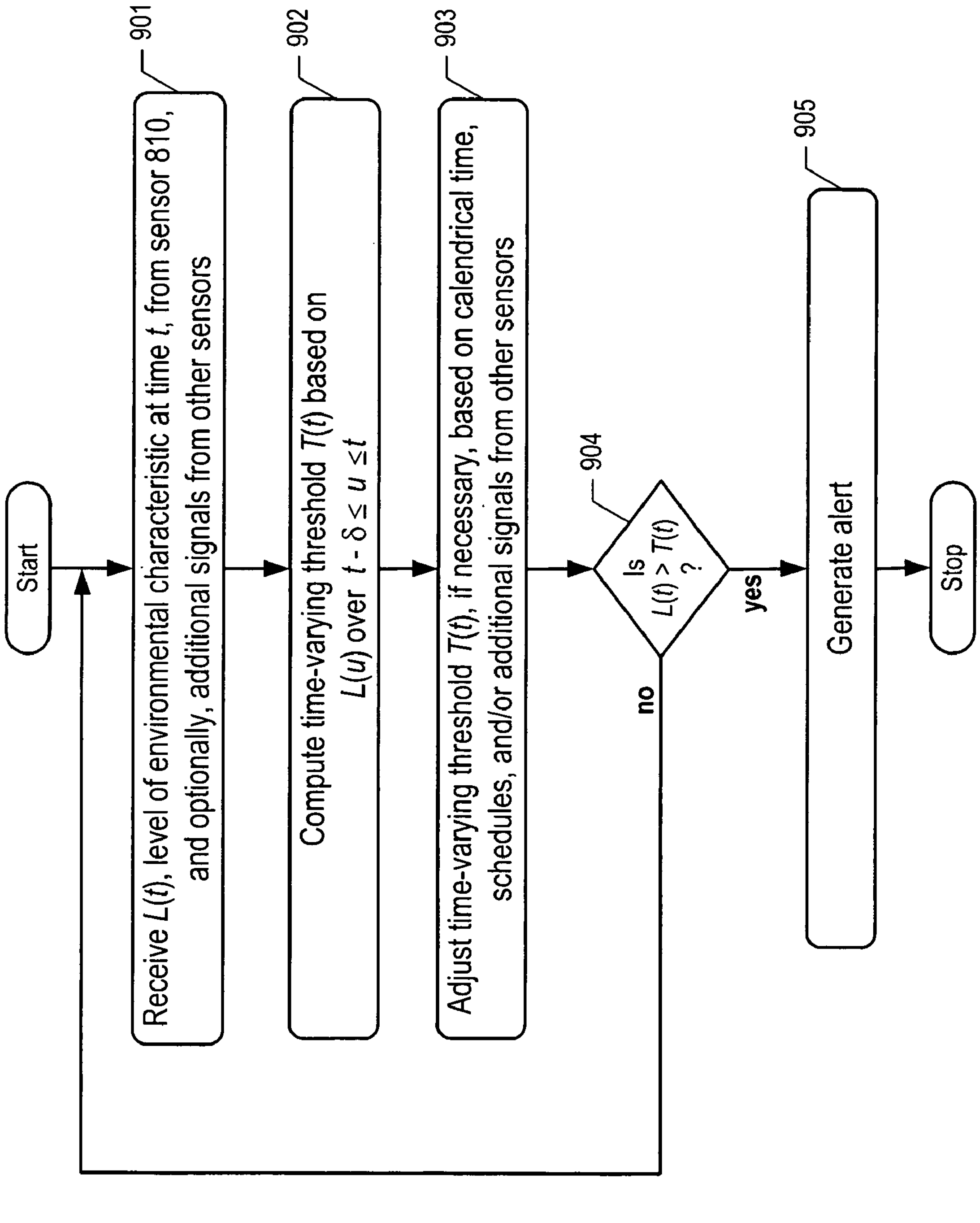
FIG. 9 depicts a flowchart of the salient tasks performed by attack-detection system 800, as shown in FIG. 8, in accordance with the illustrative embodiment of the present invention.

FIG. 9 depicts a flowchart of the salient tasks performed by attack-detection system 800, in accordance with the illustrative embodiment of the present invention. It will be clear to those skilled in the art which tasks depicted in FIG. 9 can be performed simultaneously or in a different order than that depicted.

At task 901, receiver 802 receives from sensor 810: signal L(t), the level of an environmental characteristic at time t; and optionally, one or more additional signals from other environmental characteristic sensors. Receiver 802 forwards the information encoded in these signals to processor 804, in well-known fashion.

At task 902, processor 804 runs program P to compute the value of time-varying threshold T(t) at time t, based on a sliding time window of size δ (i.e., L(u) for $t-\delta \leqq u \leqq t$).

At task 903, processor 804 adjusts time-varying threshold T(t), if necessary, based on one or more of: the calendrical time, a schedule, and an additional signal from another environmental characteristic sensor. For example, if the calendrical time indicates that it is rush hour, threshold T(t) might be adjusted to compensate for the effect of increased train frequency on signal L(t). As another example, if a train schedule or a reading from a sensor indicates that a train is coming into a subway station, threshold T(t) might be adjusted to compensate for expected changes in signal L(t) due to air movements caused by the train.

Task 904 checks whether $L(t)>T(t)$; if not, execution continues back at task 901, otherwise execution proceeds to task 905.

At task 905, processor 804 generates an alert signal that indicates that an attack has occurred, and transmits the alert signal to output device 812, in well-known fashion. After task 905, the method of FIG. 9 terminates.

It is to be understood that the above-described embodiments are merely illustrative of the present invention and that many variations of the above-described embodiments can be devised by those skilled in the art without departing from the scope of the invention. For example, in this Specification, numerous specific details are provided in order to provide a thorough description and understanding of the illustrative embodiments of the present invention. Those skilled in the art will recognize, however, that the invention can be practiced without one or more of those details, or with other methods, materials, components, etc.

Reference throughout the specification to "one embodiment" or "an embodiment" or "some embodiments" means that a particular feature, structure, material, or characteristic described in connection with the embodiment(s) is included in at least one embodiment of the present invention, but not necessarily all embodiments. Consequently, the appearances of the phrase "in one embodiment," "in an embodiment," or "in some embodiments" in various places throughout the Specification are not necessarily all referring to the same embodiment. Furthermore, the particular features, structures, materials, or characteristics can be combined in any suitable manner in one or more embodiments. It is therefore intended that such variations be included within the scope of the following claims and their equivalents.

We claim:

1. A method comprising:

obtaining a background signature, over a first time interval, of an environmental characteristic at an intended deployment site;

obtaining release data for an agent, wherein said data pertains to release of said agent in a test chamber;

modeling at a data-processing system at least one attack scenario based on said release data; and superimposing at said data-processing system said attack scenario on said background signature.

2. The method of claim 1 further comprising modifying said background signature at said data-processing system by extrapolating said background signature to a second time interval that is longer than said first time interval, wherein said extrapolation accounts for diurnal and seasonal variations of said environmental characteristic.

3. The method of claim 1 further comprising defining a threshold generator for generating at said data-processing system a time-varying threshold for discriminating between an attack and a nominal increase in a background level of said environmental characteristic.

4. The method of claim 3 further comprising generating at said data-processing system a first time-varying threshold, wherein said first time-varying threshold is based on a first function, a first set of parameters, and on the superimposed attack scenario.

5. The method of claim 4 further comprising:

modeling at said data-processing system a second attack scenario based on said release data;

superimposing at said data-processing system said second attack scenario on said background signature; and generating at said data-processing system a second time-varying threshold based on said first function, said first set of parameters, and on the superimposed second attack scenario.

6. The method of claim 4 further comprising generating at said data-processing system a second time-varying threshold based on said first function, a second set of parameters, and on said superimposed attack scenario.

7. The method of claim 4 further comprising generating at said data-processing system a second time-varying threshold based on a second function, said first set of parameters, and on said superimposed attack scenario.

8. The method of claim 1 further comprising generating at said data-processing system a plurality of time-varying thresholds;

wherein each of said time-varying thresholds is based on:

a function;

a set of parameters; and an attack scenario; and wherein the basis for each of said time-varying thresholds differs from all other of said time-varying thresholds by being based on a different function, a different set of parameters, a different attack scenario, or any combination thereof.

9. The method of 8 further comprising:

defining a performance measure, wherein said performance measure is indicative of an ability of each of said time-varying thresholds to reliably discriminate between an attack and a nominal increase in a background level of said environmental characteristic; and calculating at said data-processing system said performance measure for said plurality of said time-varying thresholds.

10. The method of claim 9 further comprising selecting at said data-processing system a best time-varying threshold based on a comparison of said calculated performance measure for said plurality of time-varying thresholds.

11. The method of claim 1 wherein said environmental characteristic is a concentration of airborne particles having a size in a range of about 1 micron to 10 microns.

12. A method comprising:

generating at a data-processing system a first signal that is representative of a background signature, over a first time interval, of airborne particles at an intended detector-deployment site;

generating at said data-processing system a second signal that is representative of release data for an agent of interest, wherein said data pertains to release of said agent in a test chamber, wherein said test chamber is physically similar to said intended detector-deployment site; and generating at said data-processing system a third signal by superimposing said second signal on said first signal.

13. The method of claim 12 further comprising generating at said data-processing system a first time-varying threshold, wherein:

said first time-varying threshold is used for discriminating between an attack and a nominal increase in a background level of said airborne particles; and said first time-varying threshold is generated by applying a first function and a first set of parameters to said third signal.

14. The method of claim 13 further comprising generating at said data-processing system a second time-varying threshold, wherein said second time-varying threshold is used for discriminating between an attack and a nominal increase in said background level of said airborne particles, and wherein said second time-varying threshold is generated in one of the following ways:

applying at said data-processing system said first function and a second set of parameters to said third signal;

applying at said data-processing system a second function and one of said first set of parameters and said second set of parameters to said third signal, and applying at said data-processing system one of said first function and said second function, and one of said first set of parameters and said second set of parameters to a fourth signal, wherein said fourth signal is obtained by permuting said release data.

15. The method of claim 14 further comprising evaluating at said data-processing system an accuracy of said first time-varying threshold and said second time-varying threshold to discriminate between said attack and said nominal increase in said background level of said airborne particles.

16. The method of claim 15 further comprising selecting at said data-processing system the one of said first time-varying threshold and said second time-varying threshold that is more accurate at discriminating.

17. The method of claim 16 further comprising programming an attack-detection system with the function and set of parameters corresponding to the one selected time-varying threshold.

18. A method comprising:

combining at a data-processing system:

(i) a background signature of airborne particle concentration that is obtained at an intended deployment location, and (ii) simulated attack data;

generating at said data-processing system a plurality of time-varying thresholds for discriminating between an attack and a nominal increase in said background signature based on the combined background signature and simulated attack data;

measuring at said data-processing system the performance of each time-varying threshold at accurately discriminating between said attack and said nominal increase in said background signature; and selecting at said data-processing system a time-varying threshold that is most accurate at said discriminating.

19. The method of claim 18 wherein the operation of generating further comprises selecting at said data-processing system a plurality of functions and plural sets of parameters.

20. The method of claim 18 wherein the operation of combining further comprises:

obtaining release data of an agent of interest; and applying at said data-processing system a fluid dynamics model to said release data to develop said simulated attack data.

* * * * *